United States Patent
Sternglass et al.

[11] Patent Number: 6,025,986
[45] Date of Patent: Feb. 15, 2000

[54] RETRACTABLE PALMREST FOR KEYBOARD-EQUIPPED ELECTRONIC PRODUCTS

[75] Inventors: Daniel I. Sternglass, 403 Highgate Rd., Ithaca, N.Y. 14850; Donald F. Grube, Rochester, N.Y.

[73] Assignee: Daniel I. Sternglass, Ithaca, N.Y.

[21] Appl. No.: 08/993,763

[22] Filed: Dec. 18, 1997

[51] Int. Cl.[7] ..................................................... G06F 1/16
[52] U.S. Cl. ....................................... 361/680; 248/118.1
[58] Field of Search ................................... 361/680, 683; 400/715; 248/118, 118.1, 118.3, 118.5

[56] References Cited

U.S. PATENT DOCUMENTS

| | | |
|---|---|---|
| D. 254,554 | 3/1980 | Genaro et al. . |
| D. 299,030 | 12/1988 | Menn . |
| D. 322,246 | 12/1991 | Izaki . |
| D. 324,035 | 2/1992 | Izaki . |
| 3,940,758 | 2/1976 | Margolin . |
| 4,739,451 | 4/1988 | Kuba . |
| 4,896,787 | 1/1990 | Delamour et al. . |
| 5,187,644 | 2/1993 | Crisan . |
| 5,231,380 | 7/1993 | Logan ...................................... 361/680 |
| 5,260,884 | 11/1993 | Stern . |
| 5,267,127 | 11/1993 | Pollitt . |
| 5,278,779 | 1/1994 | Conway et al. . |
| 5,287,245 | 2/1994 | Lucente et al. . |
| 5,457,453 | 10/1995 | Chiu et al. . |
| 5,490,039 | 2/1996 | Helms ...................................... 361/683 |
| 5,519,569 | 5/1996 | Sellers . |
| 5,526,226 | 6/1996 | Katoh et al. . |
| 5,543,790 | 8/1996 | Goldstein . |
| 5,544,005 | 8/1996 | Horikoshi et al. . |
| 5,546,334 | 8/1996 | Hsieh et al. .............................. 361/680 |
| 5,570,268 | 10/1996 | Selker ..................................... 361/680 |
| 5,754,395 | 5/1998 | Hsu et al. ................................ 361/680 |
| 5,755,410 | 5/1998 | Ambrose et al. ....................... 248/118 |
| 5,764,474 | 6/1998 | Youens .................................... 361/680 |
| 5,793,355 | 8/1998 | Youens .................................... 361/680 |
| 5,818,360 | 10/1998 | Chu et al. ............................... 400/715 |

Primary Examiner—Lynn D. Feild
Assistant Examiner—Lisa Lea-Edmonds
Attorney, Agent, or Firm—Nixon Peabody LLP

[57] ABSTRACT

A portable or stationary electronic device equipped with a typing keyboard, such as a notebook or desktop personal computer or screen-phone, with a retractable palmrest in accordance with the present invention includes a platform, circuitry, a display, a keyboard, and the retractable palmrest. The palmrest provides ergonomic benefit for typing and a suitable location for a full-size track pad (mouse pad) pointing device, mouse buttons and other low-profile peripheral devices. By retracting, and optionally folding, it reduces the size of the electronic device during storage or transport. The platform includes a front surface, opposing side surfaces, a back surface, and a top surface. The circuitry is connected to the platform. Keys forming a keyboard are connected to the top surface of the platform and are coupled to the circuitry along with the display. The palmrest includes a surface with a front edge, opposing side edges, and a back edge and is slidably connected to the platform to move to a retracted position substantially behind the front surface, in between the side surfaces, and in front of the back surface, and to an extended position substantially in front of the front surface.

18 Claims, 19 Drawing Sheets

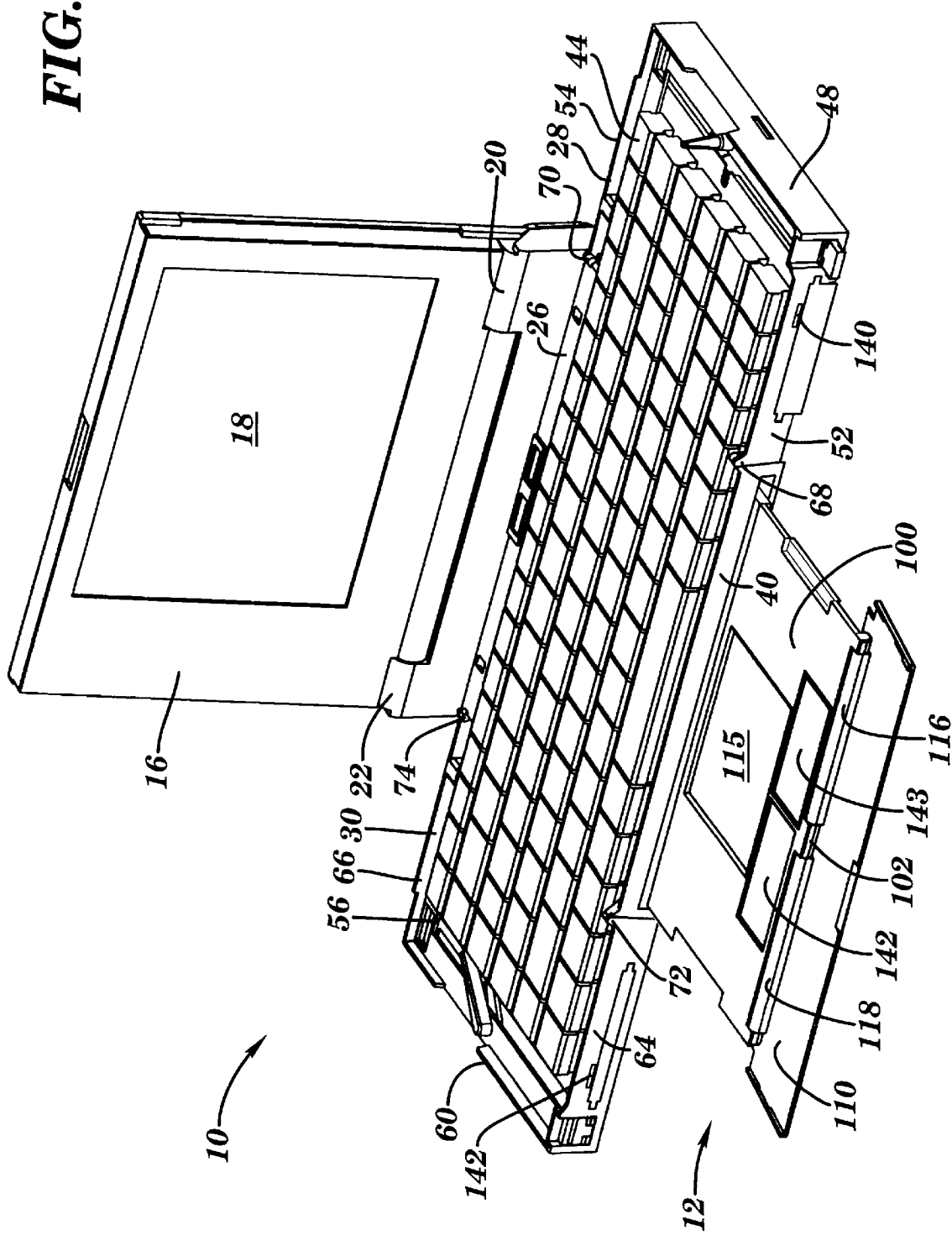

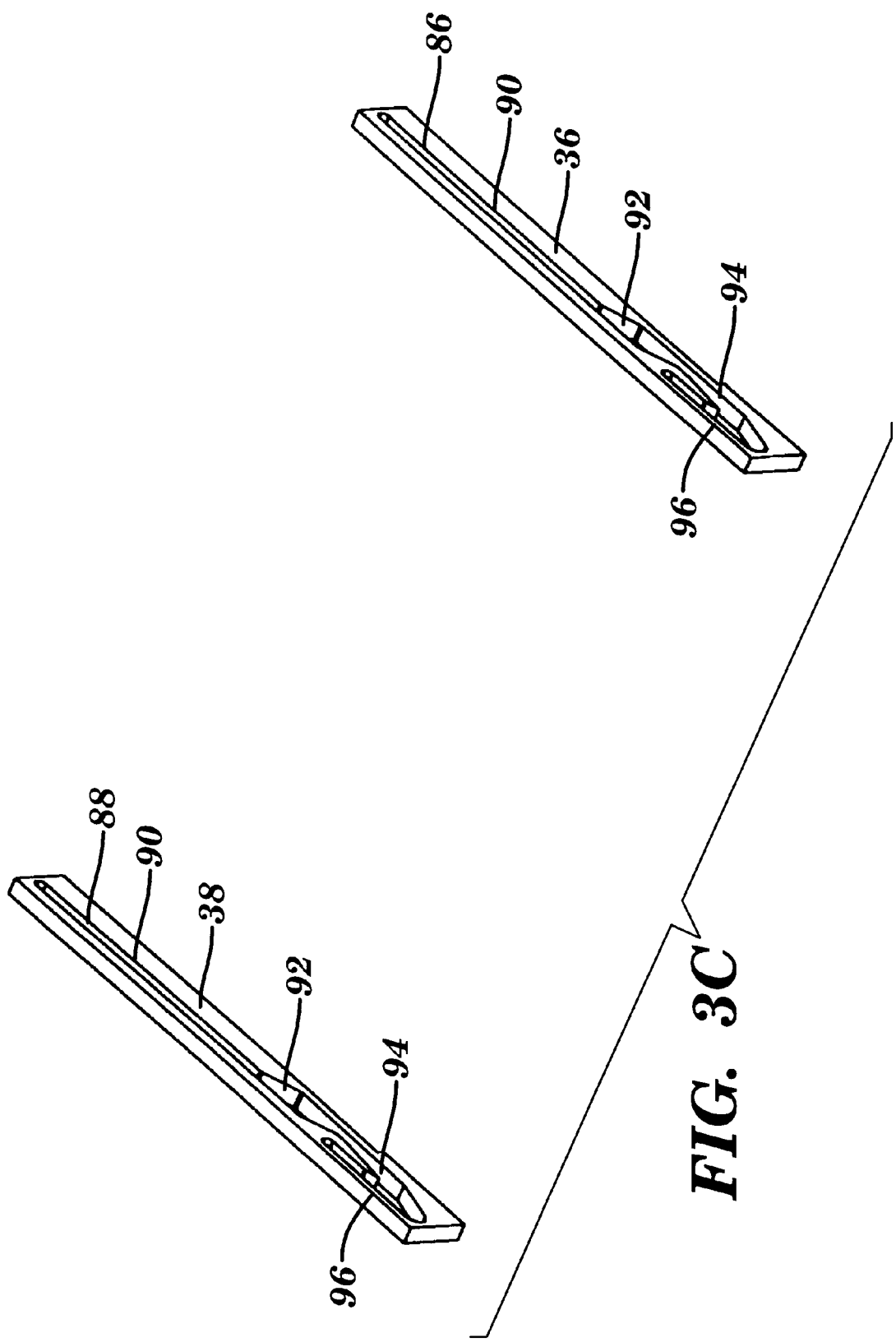

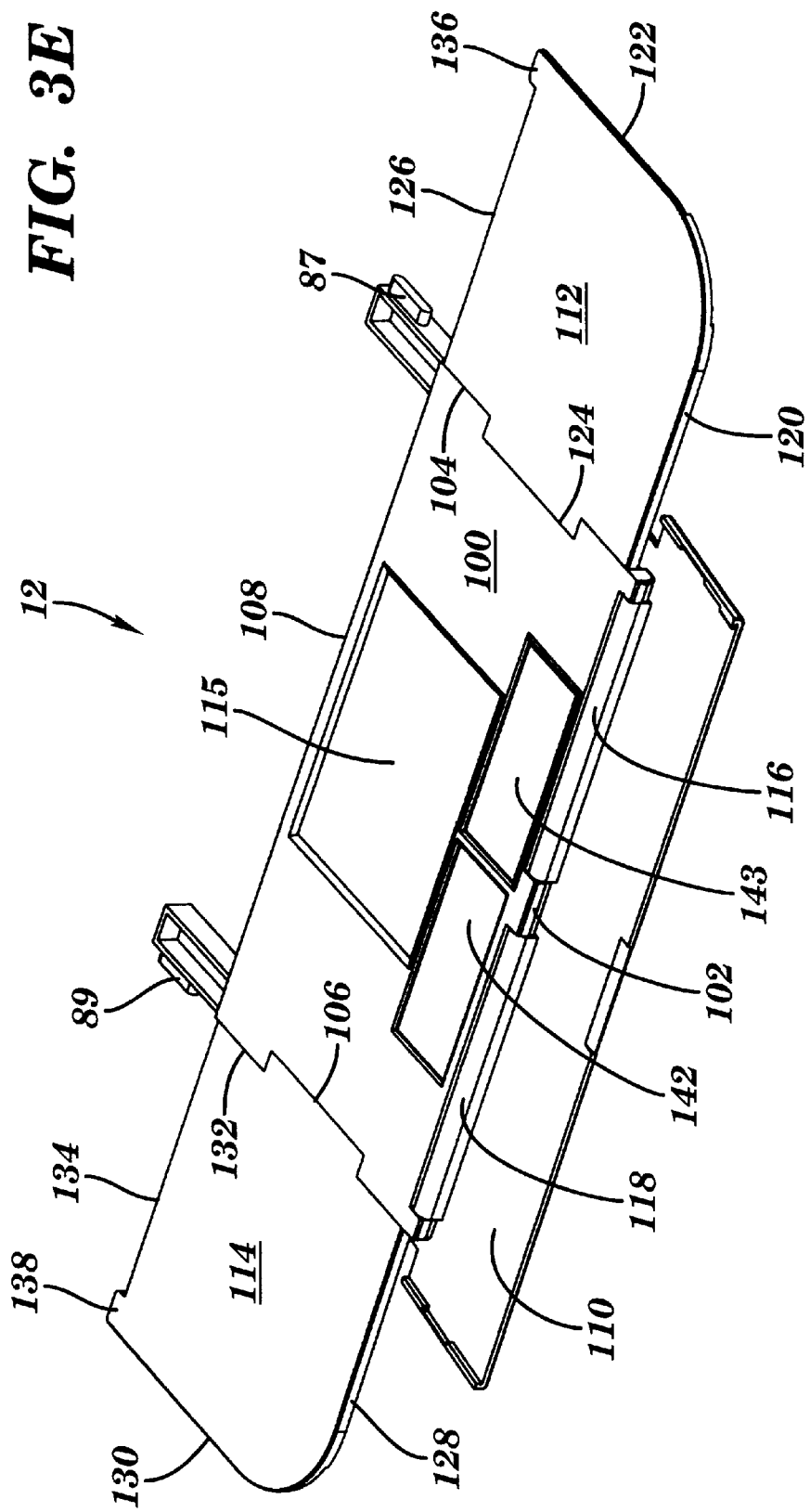

RETRACTABLE PALMREST FOR KEYBOARD-EQUIPPED ELECTRONIC PRODUCTS

FIELD OF THE INVENTION

This invention relates generally to small form-factor portable and stationary electronic devices, including personal computers and consumer products, and, more particularly, to a retractable palmrest for an electronic typing keyboard.

BACKGROUND

The number of personal computers and other typing keyboard equipped devices being used at work and at home continues to increase at a rapid rate. Unfortunately, this increase in use of keyboards has also resulted in a growing number of injuries which are linked to the use of personal computers and other keyboard equipped devices, such as carpal tunnel syndrome. Accordingly, one of the recent goals in the design of these electronic products is to reduce and/or eliminate the number of use related injuries. Some examples of recent designs to accomplish this goal are ergonomically designed keyboards and pointing devices, such as computer-mice.

A second important consideration with portable and small form-factor stationary devices incorporating typing keyboards is the ease of use of pointing devices. In many notebook computers, the lack of space for a full-size trackpad compels the use of "pointing sticks" embedded in the keyboard keys or small track balls, pressure sensitive discs or other pointing devices that are unsatisfactory for many users.

One of the problems with designing portable and small form-factor electronic products is to reduce the number of use-related injuries. Typically, this goal is at odds with the competing concern of minimizing the overall size of the product during storage and/or transport. Often designs which would help to reduce use-related injuries would make the portable or small stationary devices unnecessarily large and cumbersome.

To the extent that portable and small form-factor device redesigns have addressed keyboard ergonomics and pointing device ease-of-use issues, they have been limited to larger-size products which can incorporate a "fixed full-size keyboard palm-rest" into the surface of the main housing. However, the same problems of injury prevention and satisfactory ease of use of pointing devices still exists for the smaller size portable personal computers and other portable and stationary electronic devices, such as keyboard-equipped organizers and palmtop computers, as well as for very small stationary computers and for screen phones. As previously noted, minimizing the size of these devices during storage or transport is a primary design issue and has been at odds with ergonomic design practices.

SUMMARY

A keyboard-equipped electronic device, such as a personal computer, with a retractable palmrest in accordance with the present invention includes a platform, keys, and the retractable palmrest. The platform includes a front surface, opposing side surfaces, a back surface, and a top surface. Keys forming a keyboard are connected to the top surface of the platform. The palmrest includes a surface with a front edge, opposing side edges, and a back edge and is slidably connected to the platform to move to a retracted position substantially inside the platform.

The electronic device with the retractable palmrest provides a number of advantages including providing a support which can be easily installed during use of the device to support and reduce strain on an operator's hand or hands. A second benefit is the ability to provide the same full-size track pad pointing device and "mouse buttons" as full-size notebook computers, in small form-factor stationary and mobile electronic devices on the palmrest. Additionally, the retractable palmrest can be easily stored to minimize the overall size of the device during storage and/or transport.

BRIEF DESCRIPTION OF THE DRAWINGS

FIG. 1C is a perspective right front view of the retractable palmrest in the personal computer in an extended, folded, and unsecured position

FIG. 3C is a perspective view of the side surfaces of the central section;

FIG. 3E is a top perspective view of the palmrest;

DETAILED DESCRIPTION

Figure 1A:
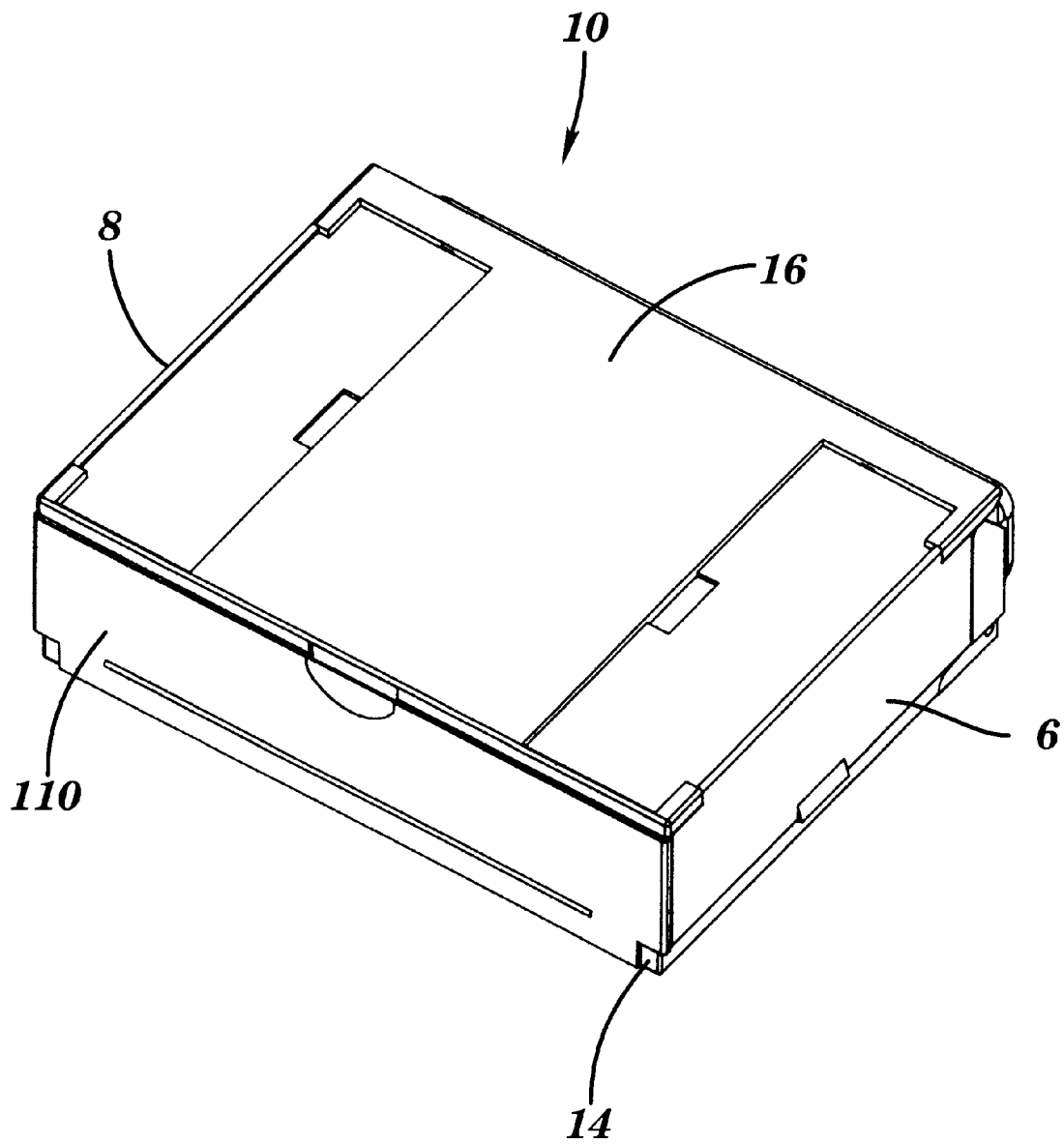
FIG. 1A is a perspective right front view of a retractable palmrest in a personal computer, with a folding keyboard, in a retracted position.
Figure 1B:
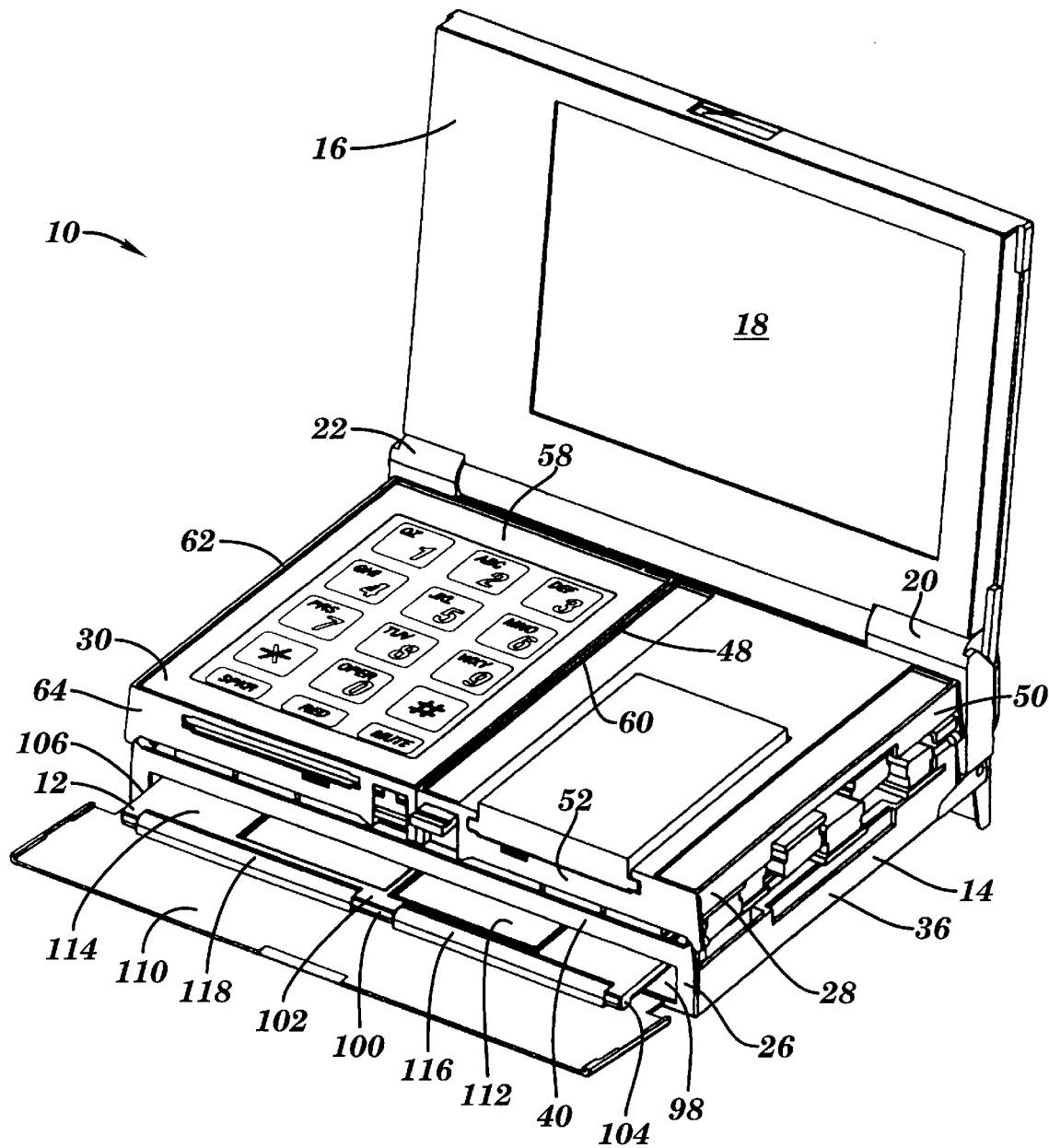
FIG. 1B is a perspective right front view of the retractable palmrest in the personal computer in a partially extended position.

A personal computer 10 with a retractable palmrest 12 in accordance with one embodiment of the present invention is illustrated in FIGS. 1A–1F. Generally, the personal computer includes a platform 14 and the retractable palmrest 12 which can be moved to at least a retracted and stored position, an extended and unsecured position, and to an extended and secured position. The retractable palmrest 12 provides a number of advantages including providing a retractable support which can be easily installed during use to support and reduce strain to an operator's hand or hands during use of the keyboard and which can be easily stored to minimize the overall size of the personal computer 10. The retractable palmrest 12 provide a further advantage in that it makes it possible to provide the full-sized track-pad pointing device and full size mouse-buttons characteristic of a full-sized notebook computer in a much smaller overall package and in a more accessible location.

Referring more specifically to FIGS. 1A–1F, FIG. 2 and FIG. 5D, the personal computer 10 includes a cover 16 with a display 18 built-in. The cover 16 is pivotally connected by hinge assemblies 20 and 22 to the platform 14 and can be moved to a position resting on the platform 14 and to one or more positions pivoted away from the platform 14. The display 18 is coupled to circuitry 24, which is described in greater detail below, located in the platform 14. Although in this particular embodiment, the personal computer 10 has a cover 16 with a display 18 built-in, the computer 10 could have a separate display terminal coupled to the circuitry 24 and no cover, or the keyboard could be a separate, self-contained unit, coupled to the circuitry 24 via a cable, as shown in alternate embodiment FIG. 5D.

Continuing the discussion of the personal computer embodiment, the platform 14 comprises a central section 26, a right section 28, and a left section 30. The central section 26 includes a top surface 32, a bottom surface 34, a side surfaces 36 and 38, a front surface 40, and a back surface 42. The right section 28 also includes a top surface 44, a bottom surface 46, side surfaces 48 and 50, a front surface 52, and a back surface 54. The left section 30 also includes a top surface 56, a bottom surface 58, side surfaces 60 and 62, a front surface 64, and a back surface 66. Although in this example the platform 14 has central, right, and left sections 26, 28, and 30, the platform 14 may have other variations, such as just a central section 26, a central section 26 and a right section 28, a central section 26 and a left section 30.

The right section 28 is pivotally connected by hinge assemblies 68 and 70 to the central section 26 along side surfaces 36 and 50 of the central and right sections 26 and 28. Similarly, the left section 30 is pivotally connected by hinge assemblies 72 and 74 to the central section 26 along side surfaces 38 and 62 of the central and left sections 26 and 30. The right and left sections 28 and 30 can each be pivoted between a closed position resting on the central section 26 and an open position providing an extension of the central section 26.

The top surfaces 32, 44, and 56 of the central, right and left sections 26, 28, and 30 when folded out contain a plurality of keys 76 which form a standard size keyboard. Each key 76 is normally held in a raised position above the platform 14 by a biasing device (not shown) connected between the platform 14 and each key 76. Each of the key tops is normally held in substantially the same plane. When a key 76 is depressed, the key 76 completes a connection which is coupled to circuitry 24. Although in this particular embodiment, the components on top surfaces 32, 44, and 56 of the central, right and left sections 26, 28, and 30 are keys 76, other types of components, such as a track pad (also referred to as a mouse pad), membrane or other low-profile keys or switches, a microphone, or a speaker, could be located on the top surfaces 32, 44, and 56 of the central, right, and/or left sections 26, 28, and 30, with or without the keys 76, as needed or desired.

Figure 2:
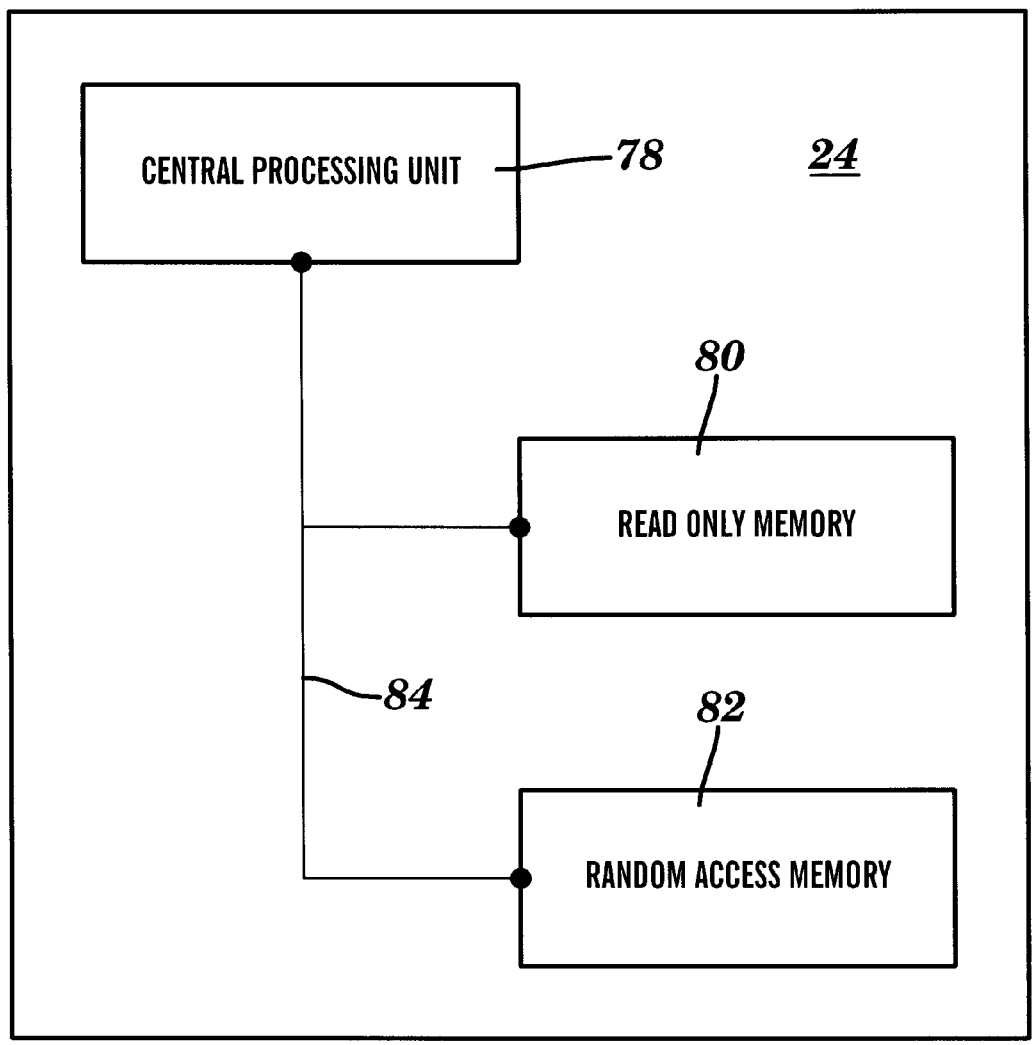
FIG. 2 is a block diagram of the circuitry for the personal computer.
Figure 3A:
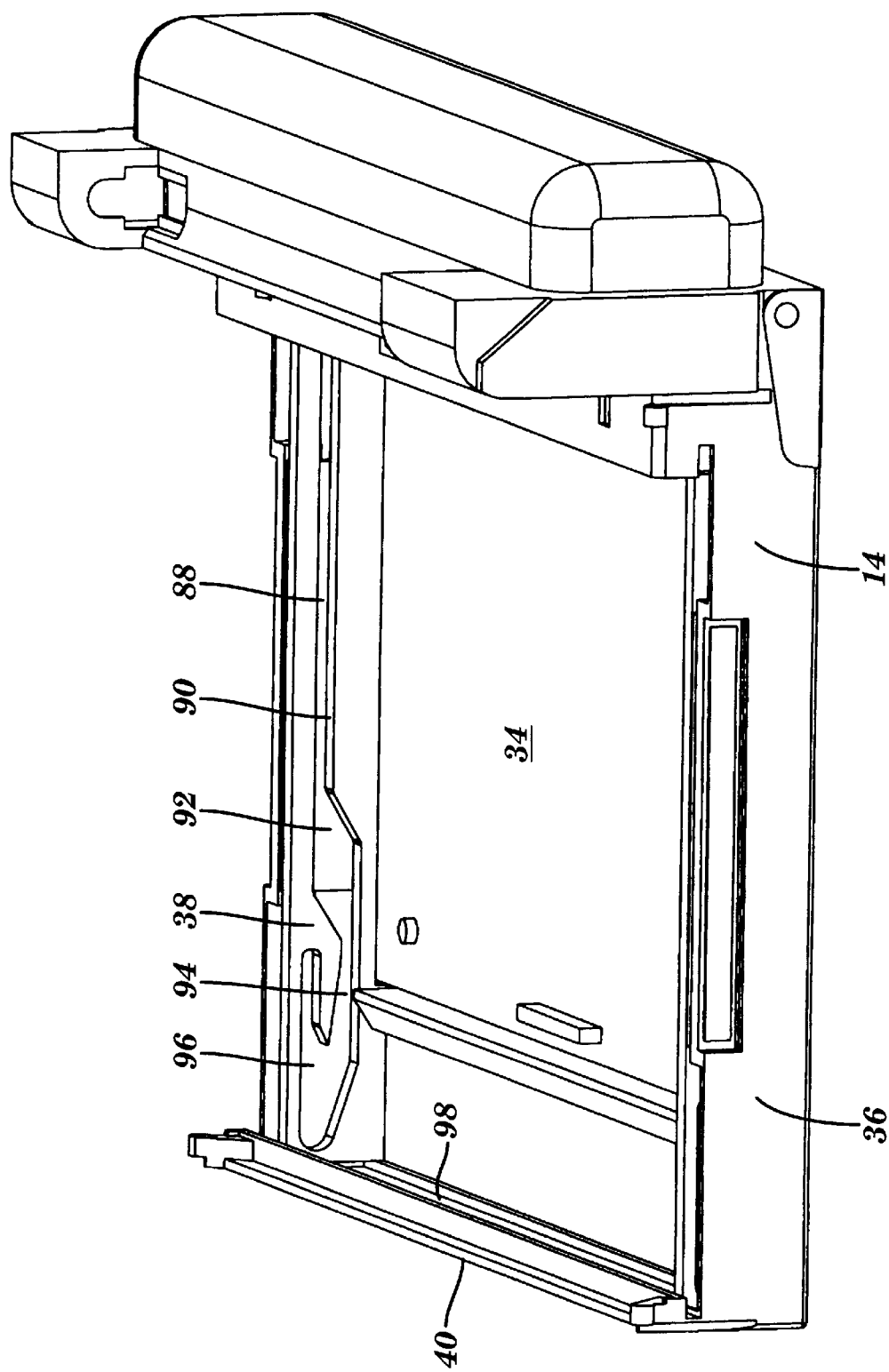
FIG. 3A is a perspective right side view of a central section of a platform for the personal computer.
Figure 3B:
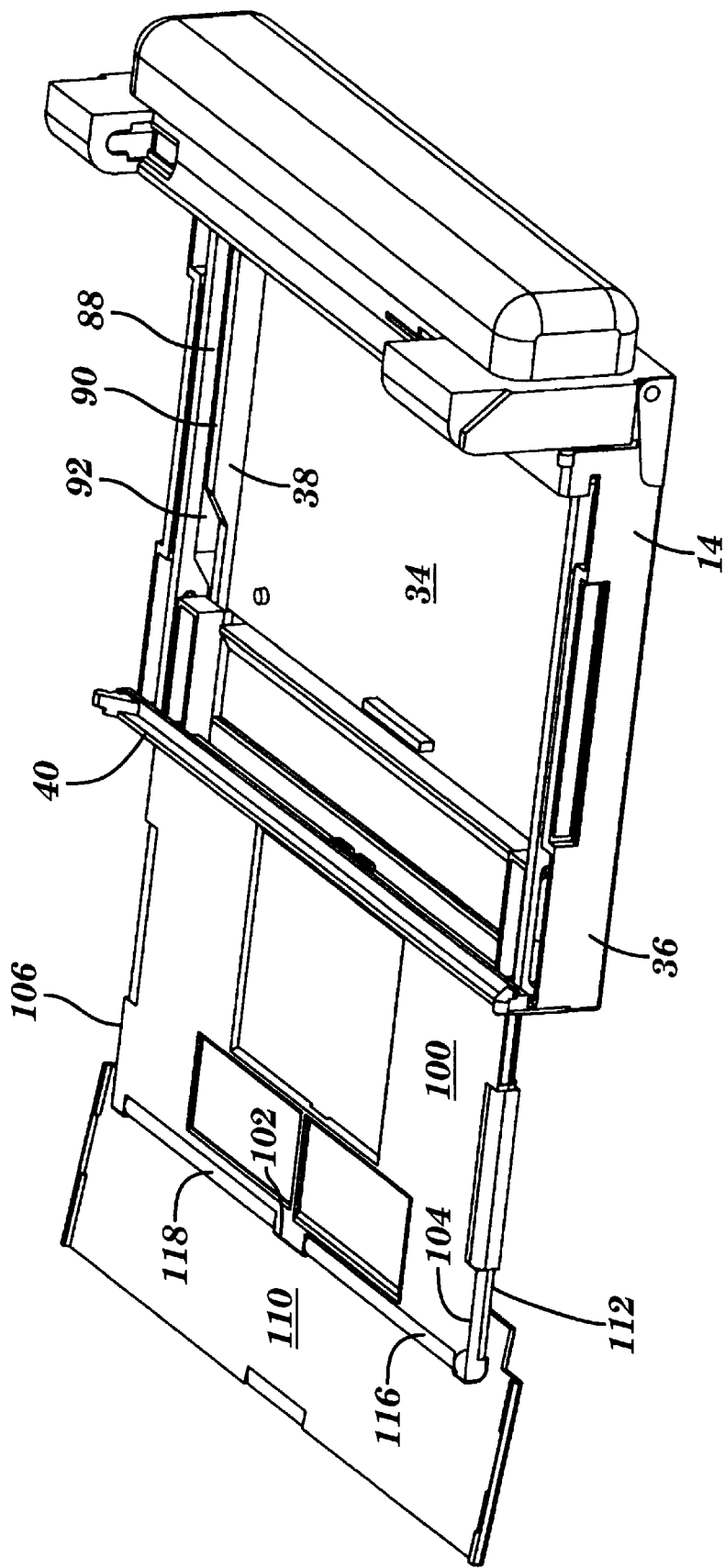
FIG. 3B is a perspective right side view of the central section with the retractable palmrest in the extended and unsecured position.
Figure 3D:
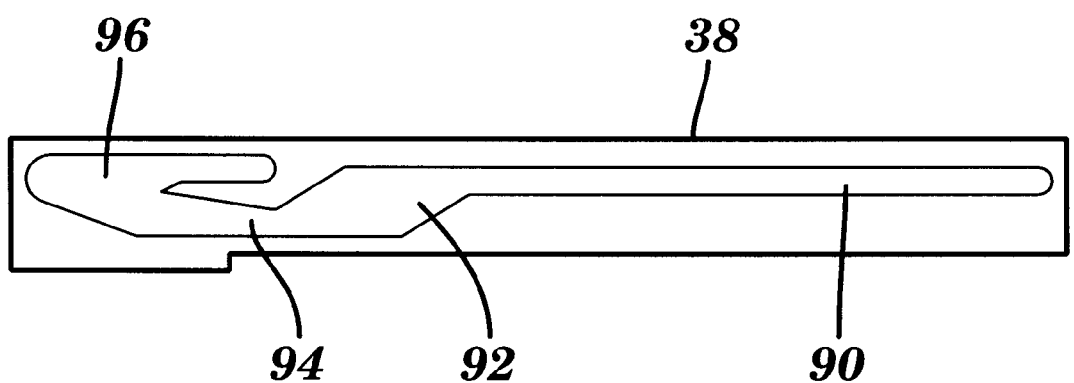
FIG. 3D is a side view of one of the side surfaces of the central section.
Figure 3F:
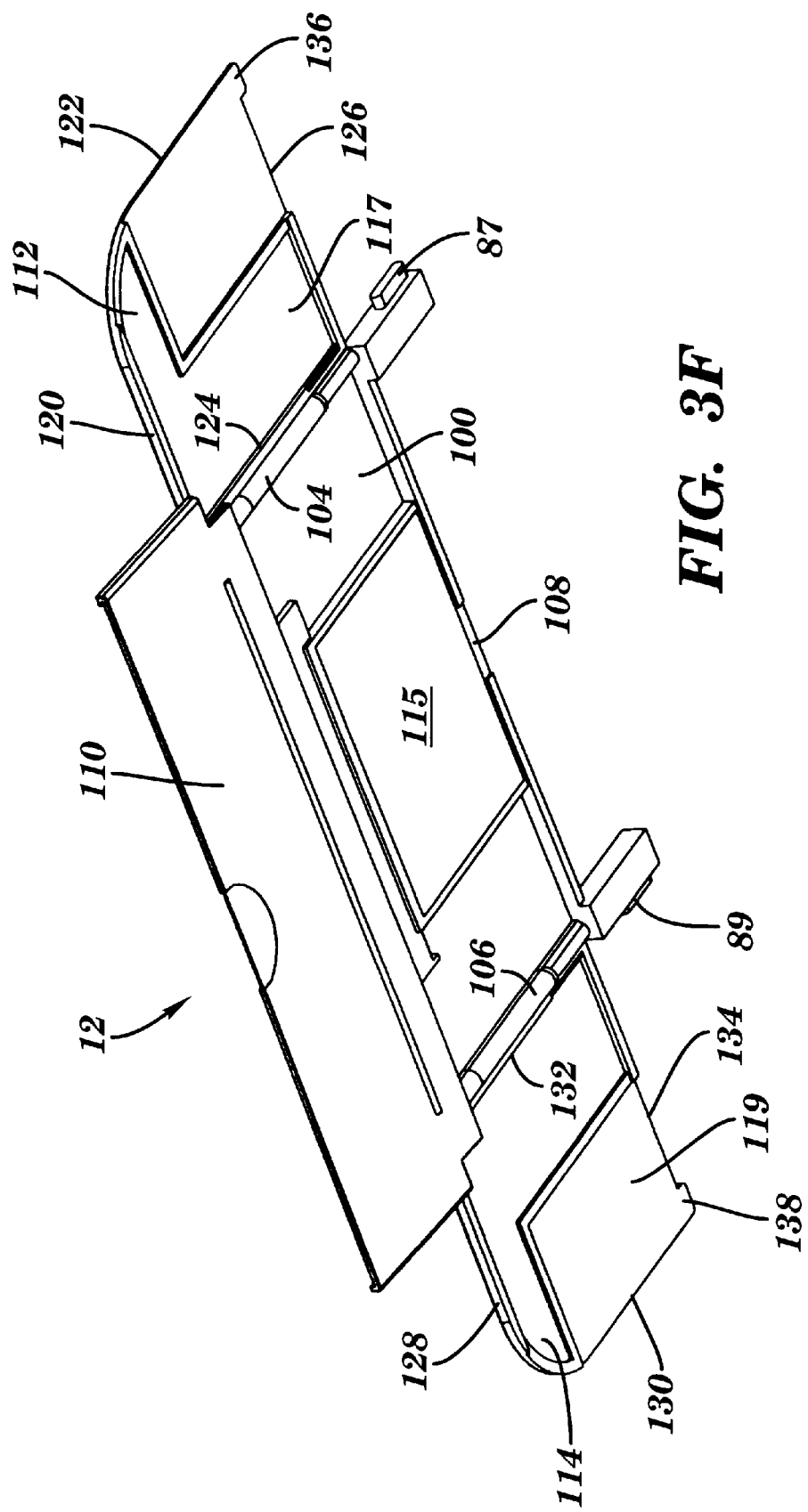
FIG. 3F is a bottom perspective view of the palmrest.

Referring to FIG. 2, a block diagram of the circuitry 24 or computer operating components for computer 10 located in the platform 14 are illustrated. Typically, this circuitry includes a central processing unit 78, a read only memory 80, a random access memory 82, and a bus 84. By way of example, U.S. Pat. No. 5,267,127 to Pollitt, which is herein incorporated by reference, discloses typical circuitry for a personal computer and its operation. Similar circuitry is commonly used in organizer and other computer-like hand-held devices. Note that these basic elements of a computer system are typically present in any microprocessor based device using a keyboard, such as a screen-phone. It is readily apparent that in those applications, they are supplemented by additional circuitry (not shown) specific to the function of the device. The electronic devices incorporated into the palmrest base 100 can be connected to the circuitry 24 via a standard flexible cable (not shown) as required by the particular devices. Such a cable may also be extended and appropriately modified to connect to devices in the hinged sections 112 and 114, or located towards the left and right sides of a single section palmrest. Although a track-pad and mouse buttons are shown in the present embodiment, various low-profile peripheral devices such as microphones, speakers, indicators, keypads or displays could be incorporated anywhere in the palmrest.

Referring to FIGS. 1A–1E and 3A–3F, the central section 26 includes a pair of substantially matching tracks 86 and 88 or rails located inside the central section 26 along the side surfaces 36 and 38. Each track 86 and 88 extends from a position beginning near the back surface 42 of the central section 26 along a relatively straight portion 90 to a sloped portion 92. From the sloped portion 92, each track continues along another portion 94 towards the front surface 40 and then begins a portion 96 which heads back towards the back surface 42. The central section 26 also includes a slot or opening 98 located in and which extends along a portion of the front surface 40 of the central section 26.

Referring to FIGS. 1B–1E, 3B, 3E, and 3F, the retractable palmrest 12 includes a base 100, a cover member 110, and a pair of optional palmrest wing sections 112 and 114. Although two palmrest wing sections 112 and 114 are shown, the palmrest 12 may have no wing sections, only one wing section, or as many as needed or desired. The base 100 includes a front edge 102, opposing side edges 104 and 106, and a back edge 108. The side edges 104 and 106 of the base 100 are slidably mounted in the tracks 86 and 88 inside the central section 26 along the side surfaces 36 and 38. The base 100 can ride in these tracks 86 and 88 to a retracted position inside the central section 26 and to an extended position substantially out of the central section 26. A projection 87 and 89 extends out from each of the side edges 104 and 106 of the base to ride in tracks 86 and 88. One or more components, such as a track pad 115 providing computer mouse functionality, mouse buttons 142 and 143, keys, a speaker, or a microphone, may be connected to the base 100 and coupled to the circuitry 24. These components may also be located on the optional hinged sections 112 and 114.

Referring to FIGS. 1A–1F, an optional cover member 110 is pivotally connected by hinge assemblies 116 and 118 to the front edge of the base 100. When the palmrest 12 is in the retracted position, the cover member 110 is pivoted to rest against the front surface 40 of the central section 26 of the platform 14, as shown in FIG. 1A. When the palmrest 12 is extended out, the cover member 110 pivots forward to provide a substantially horizontal extension of the base 100.

Referring to FIGS. 1C–1F, 3B, 3E, and 3F, the right palmrest wing section 112 includes a front edge 120, side edges 122 and 124, and a back edge 126 and the left palmrest wing section 114 includes a front edge 128, side edges 130 and 132, and a back edge 134. Right palmrest wing section 112 is pivotally connected along one of the side edges 124 to one side edges 104 of the base 100 and left palmrest wing section 114 is pivotally connected along one of the side edges 132 to one of the side edges 106 of the base 100. Each palmrest wing section 112 and 114 can be pivoted to a position resting on the base 100 and to a position where the wing section 112 and 114 provides a substantially horizontal extension of the base 100. Each wing section 112 and 114 also includes a tab detent 136 and 138 which extends out and away from the back edge 126 and 134 of the wing sections 112 and 114. In the embodiment shown, the palmrest wing sections are shown hinging to fold "downward." This approach is advantageous because the space used by the thickness of track-pad 115 is accommodated in the clearance 117 and 119 in the palmrest wings 112 and 114. Similarly, the thickness of the mouse buttons, or any other devices incorporated into the base 100 can be accommodated in such clearances. It is also possible to hinge the palmrest wings to fold "upward," if so desired. An upward folding application can incorporate a clearance similar to 117 and 119 to accommodate devices that may protrude above the plane of the base 100.

Each palmrest wing section 112 and 114 may also have one or more components, such as a track pad 115 providing computer mouse functionality, mouse buttons 142 and 143, keys, a speaker, or a microphone, connected to the wing sections 112 and 114 and coupled to the circuitry via a flexible ribbon cable (not shown). 24. When the palmrest is in the extended, unfolded, and secured position, the track pad 115 is coupled to the circuitry 24. A full or normal size track pad 115 can be incorporated on the palmrest 12. As noted above, if the implementation uses hinged palmrest wing sections 112 and 114, clearance for devices incorporated into the base 100 can be achieved by reducing the thickness of the palmrest wing sections 112 and 114 as desired in the appropriate areas. This minimizes the overall thickness of the palmrest 12 when folded.

Referring to FIGS. 1C, 1D, 1E, 4A, and 4B, the right section 28 includes an opening 140 in the front surface 52 designed to detachably receive the tab detent 136. Similarly, the left section 30 includes another opening 142 in the front surface 64 designed to detachably receive tab detent 138. Although in this particular embodiment, the palmrest 12 and the platform 14 have two tab detents 136 and 138 and two openings 140 and 142, the palmrest 12 and platform 14 can have more or less than two tab detents 136 and 138 and two openings 140 and 142, can have the tab detents and openings located elsewhere on the palmrest wing sections, or on the base 100 and central section 26, and can have other types of securing mechanisms, as needed or desired.

Referring to FIG. 1A, during storage the palmrest 12 is in a retracted position substantially between the side surfaces 36 and 38 and between the front and back surfaces 40 and 42 in the central section 26. The cover 16 for the computer 10 is pivoted down to rest on the platform 14 and the cover member 110 rests against the front surface 40 of the central section 26. In this retracted position, the palmrest 12 is stored to minimize the overall size of the electronic device such a personal computer 10.

Figure 1D:
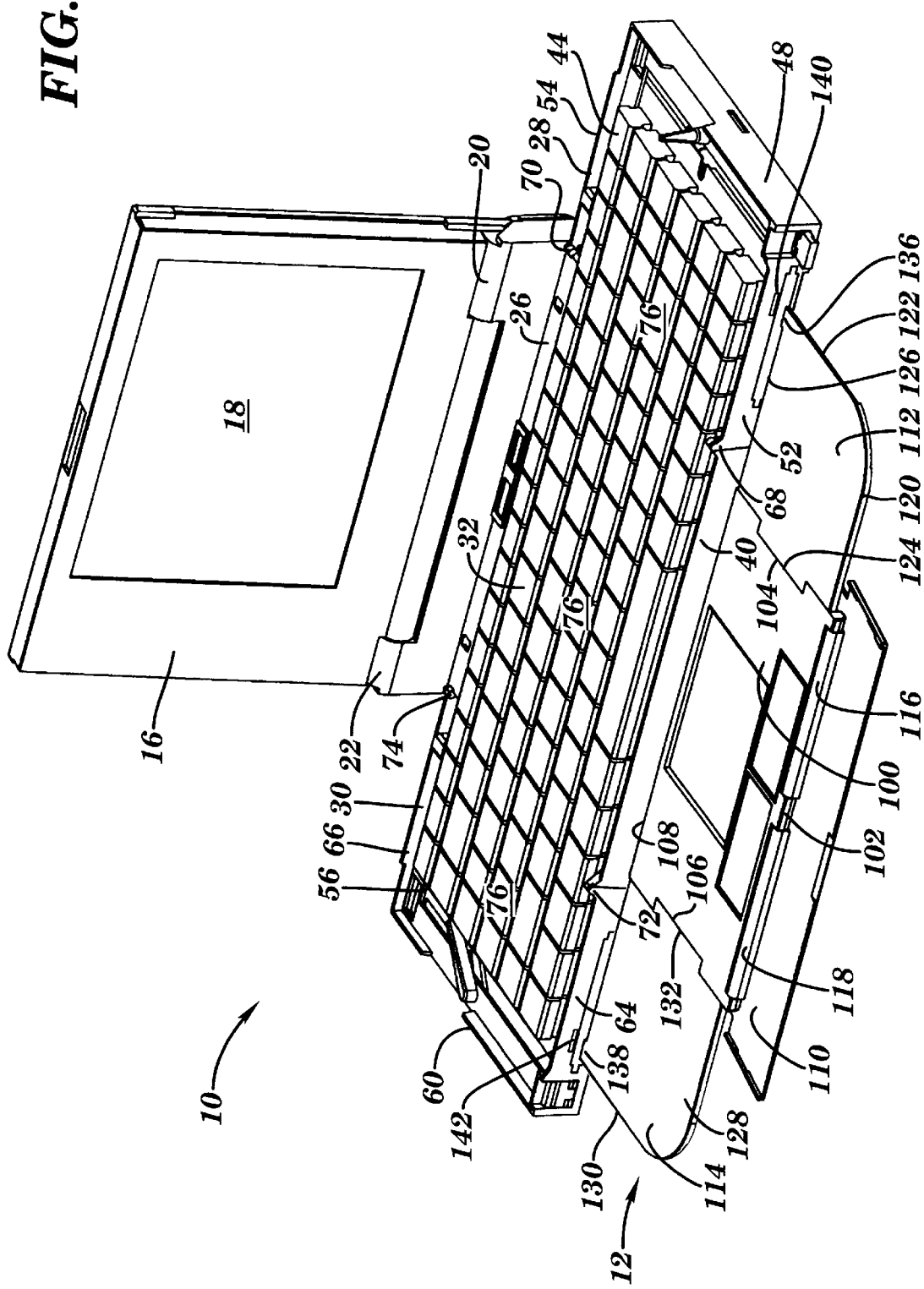
FIG. 1D is a perspective right front view of the retractable palmrest in the personal computer in an extended, unfolded, and unsecured position.

Referring to FIGS. 1B, 1C, 3A–3F, 4A, and 4B to begin to open the computer 10 the side covers 6 and 8 are lifted and pivoted into their storage recesses in cover 16. Then cover 16 is pivoted back away from the platform 14. Additionally, the palmrest 12 is slid along the substantially longer straight portion 90 of the tracks 86 and 88 down the sloped portion 92 of the tracks 86 and 88, and along the portion 94 of the tracks 86 and 88 to an extended, folded, and unsecured position, as shown in FIG. 1C. As the palmrest 12 is slid to the extended position, folded, and unsecured position out through the opening 98 in the central section 26 along the tracks 86 and 88, the cover member 110 is pivoted down away from the front surface 40 of the central section 26. Next, the palmrest wing sections 112 and 114 are unfolded from base 100 as shown in FIG. 1D to provide a substantially horizontal extension of the base 100. In this position for the palmrest wing sections 112 and 114, the tab detents 136 and 138 are aligned to engage the openings 140 and 142 and in the front surfaces 52 and 64 of the right and left sections 28 and 30. In this extended, unfolded, and unsecured position the tab detents 136 and 138 are not yet detachably inserted in the openings 140 and 142.

Figure 1E:
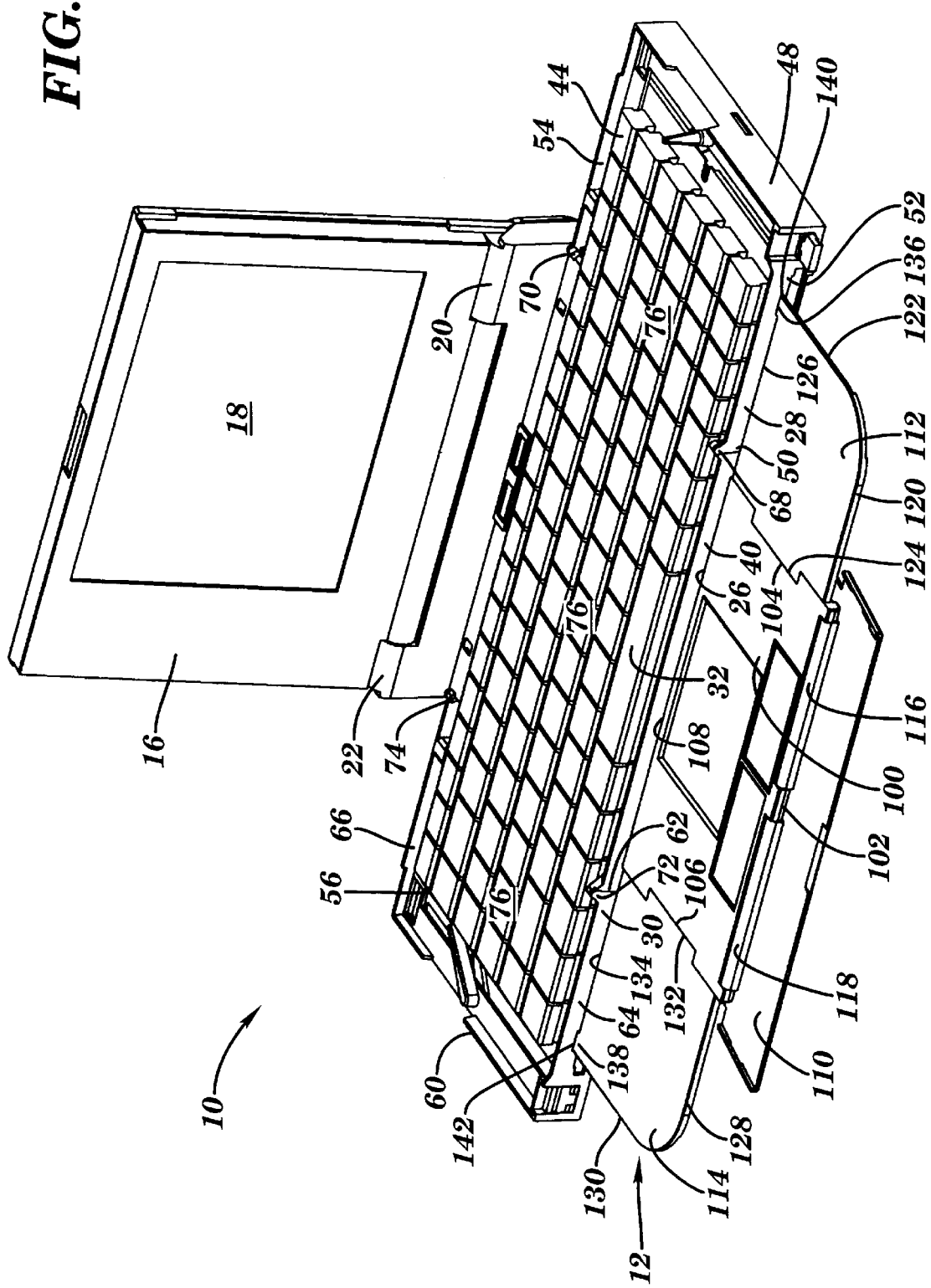
FIG. 1E is a perspective right front view of the retractable palmrest in the personal computer in an extended, unfolded, and secured position.
Figure 1F:
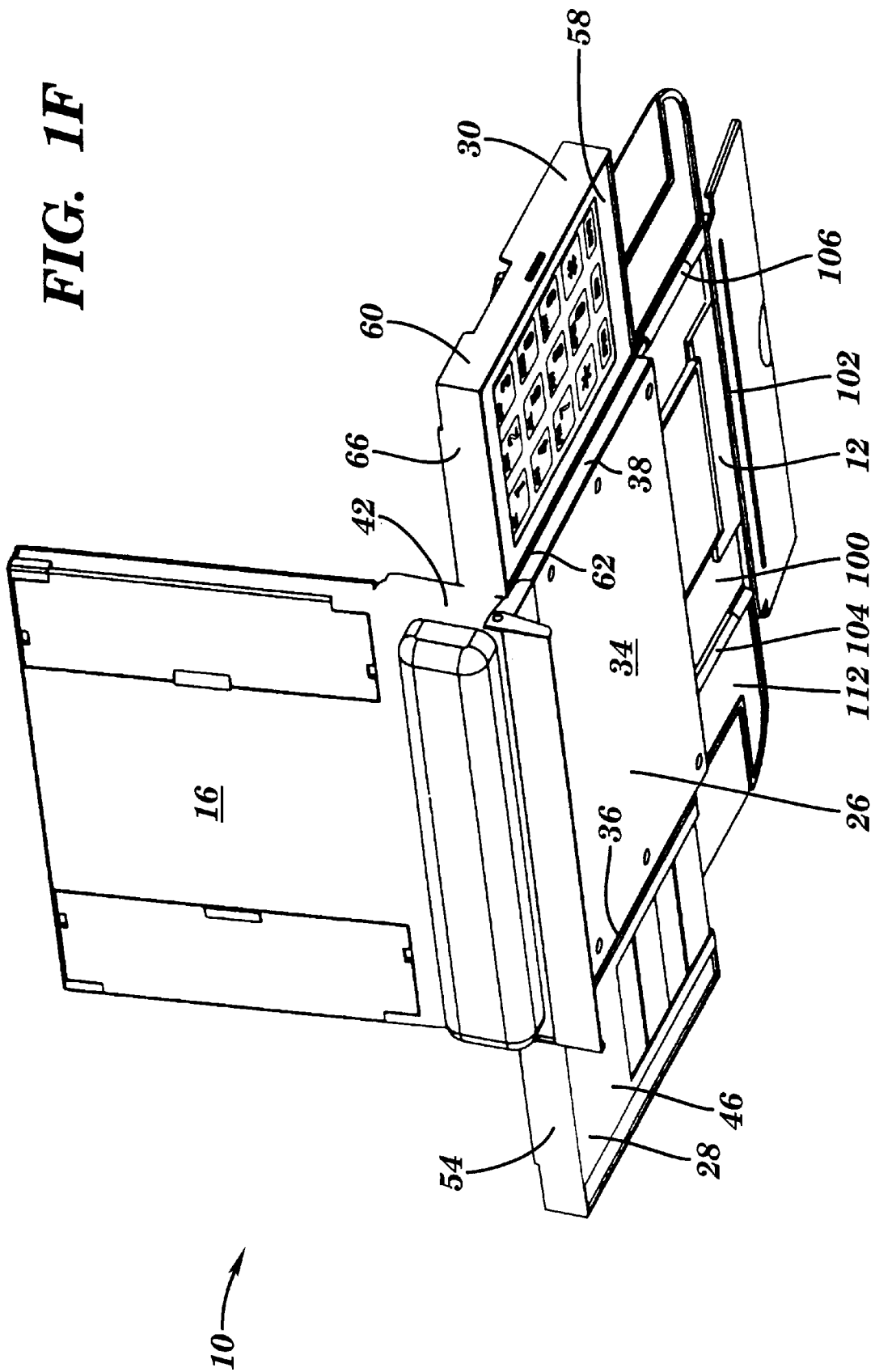
FIG. 1F is a perspective right bottom view of the retractable palmrest in the personal computer in an extended, unfolded, and secured position.
Figure 4A:
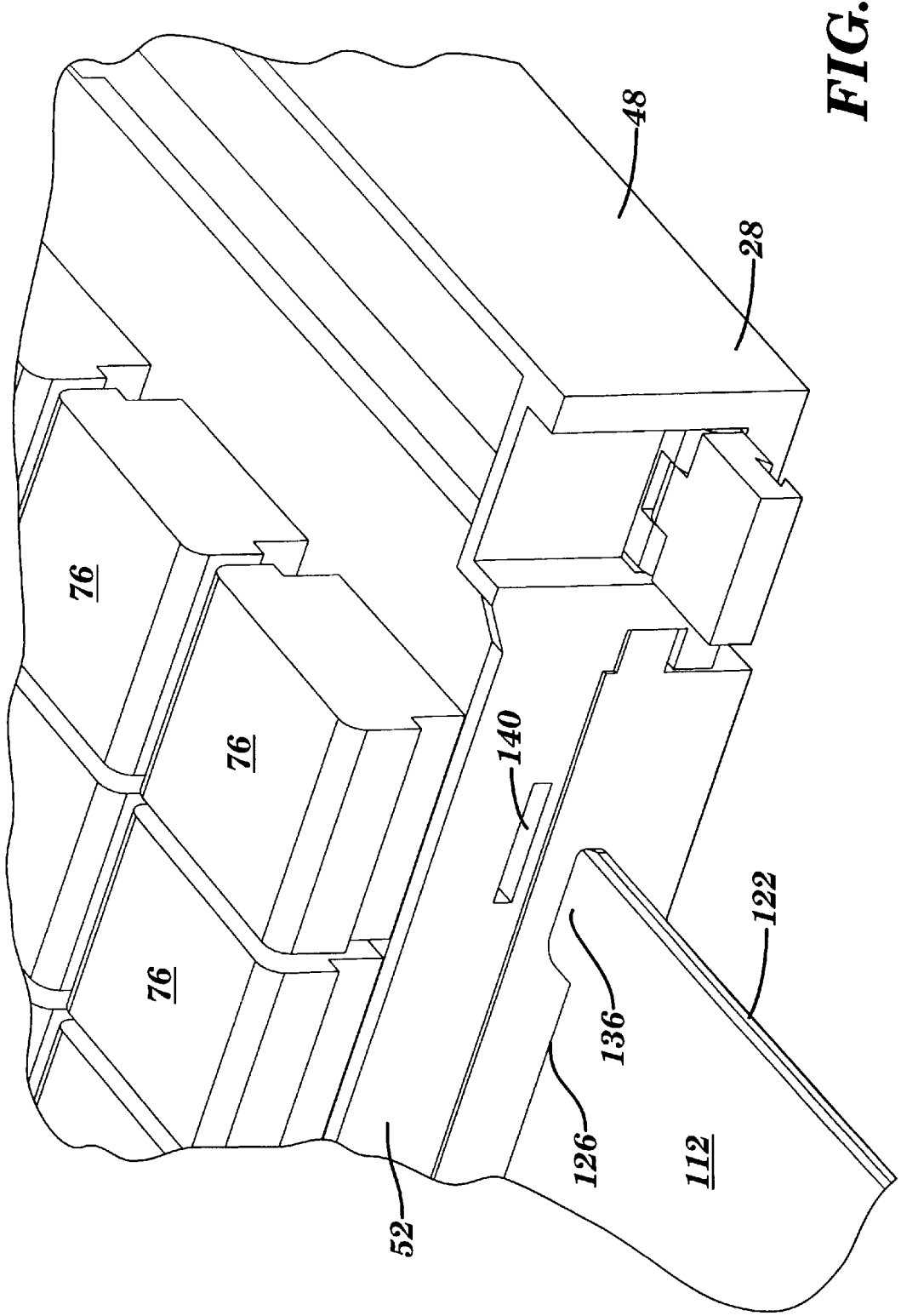
FIG. 4A is an enlarged perspective view of a portion of the right front of the platform with the palmrest in the extended and unsecured position.
Figure 4B:
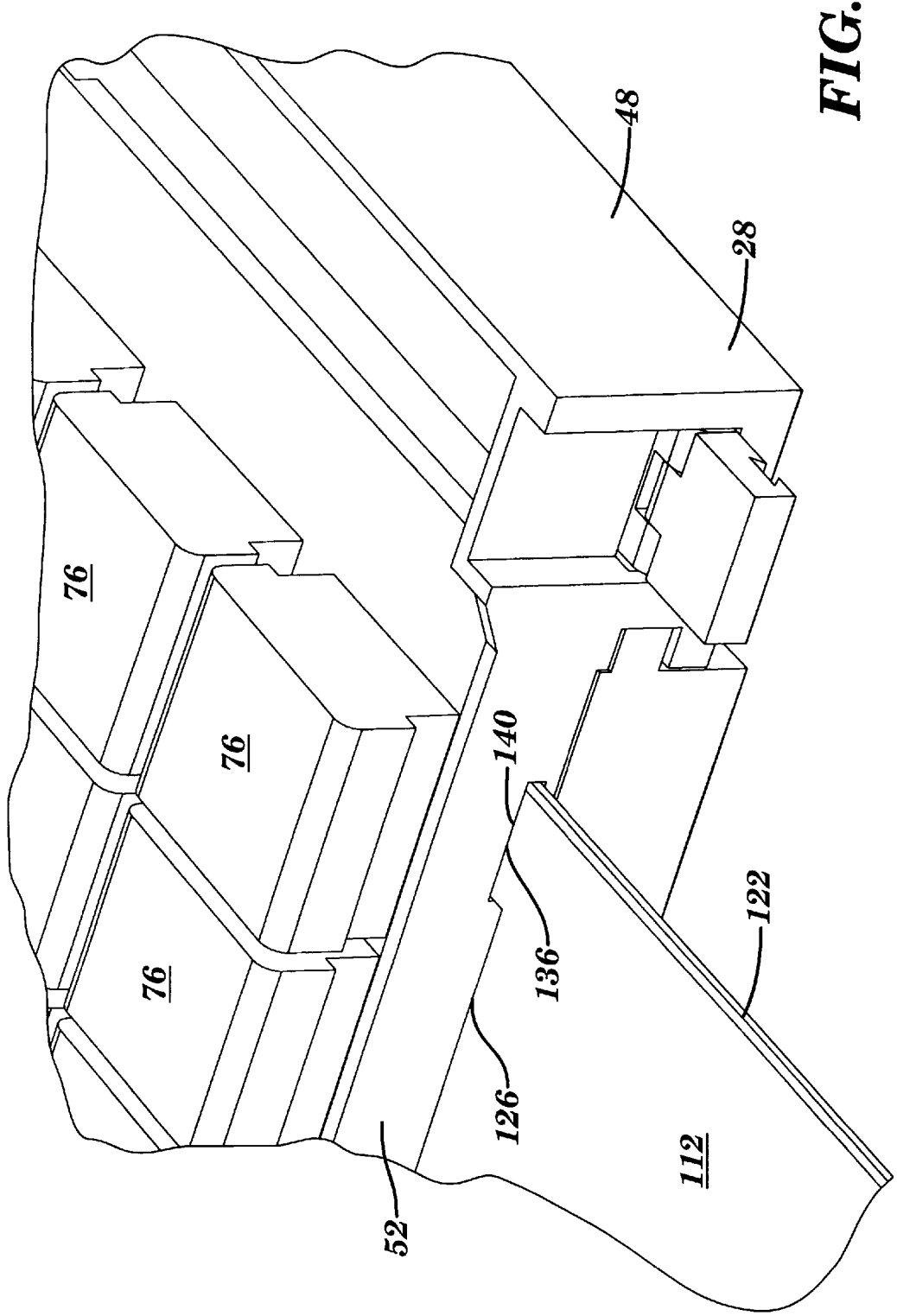
FIG. 4B is a perspective view of the portion of the right front of the platform position with the retractable palmrest in the extended and secured position.

Referring to FIGS. 1E, 3A–3F, 4A, and 4B, as the palmrest 12 is pulled further out, the palmrest 12 begins to ride up and back along a portion 96 towards the back surface 42 of the central section 26. As the palmrest 12 slides back towards the back surface 42 of the central section 26 the tab detents 136 and 138 are detachably engaged in the openings 140 and 142 in the front surfaces 52 and 64 of the right and left sections 28 and 30 to put the palmrest 12 in an extended, unfolded, and secured position, as shown in FIGS. 1E and 1F and 4B. In this extended, unfolded, and secured position, the palmrest 12 is located in front of the keys 76 on the central, right, and left sections 26, 28, and 30 and provides support for an operator's hand or hands to reduce strain during use of the keys 76 and other components. Note that the required location of the plane of the palmrest in the operating position is largely a function of the overall thickness of the keyboard assembly comprised of keys 76 and the thickness of the planar member that the keys are attached to. In the case of a thicker keyboard, a multiple-bar linkage such as a "4-bar" linkage may be required between the projections 87 and 89 and the tracks 86 and 88. Such a linkage would fit between the edges of the palmrest 104 or 104 and the tracks 86 and 88. This is required in applications where the palmrest elevation must be increased more than is practical using only the sloping section 92 of the tracks 86 and 88. Such a linkage is typically not required with notebook and palmtop computer keyboards, which typically range from 5 mm–9 mm in overall thickness.

To store the retractable palmrest 12, the process is simply reversed. Initially, the tab detents 136 and 138 are detached from the openings 140 and 142 in the front surfaces 52 and 64 of the right and left sections 28 and 30 by the user pulling the palmrest forward. The wing sections 112 and 114 are folded back in to rest under the base 100 of the palmrest 12 and the palmrest 12 is slid along the tracks 86 and 88 back through the opening 98 to a retracted position inside the central section 26. The cover member 110 is again pivoted up to rest against the front surface 40 of the central section 26 and the cover 16 of the computer 10 is pivoted down to rest on the platform 14.

Figure 5A:
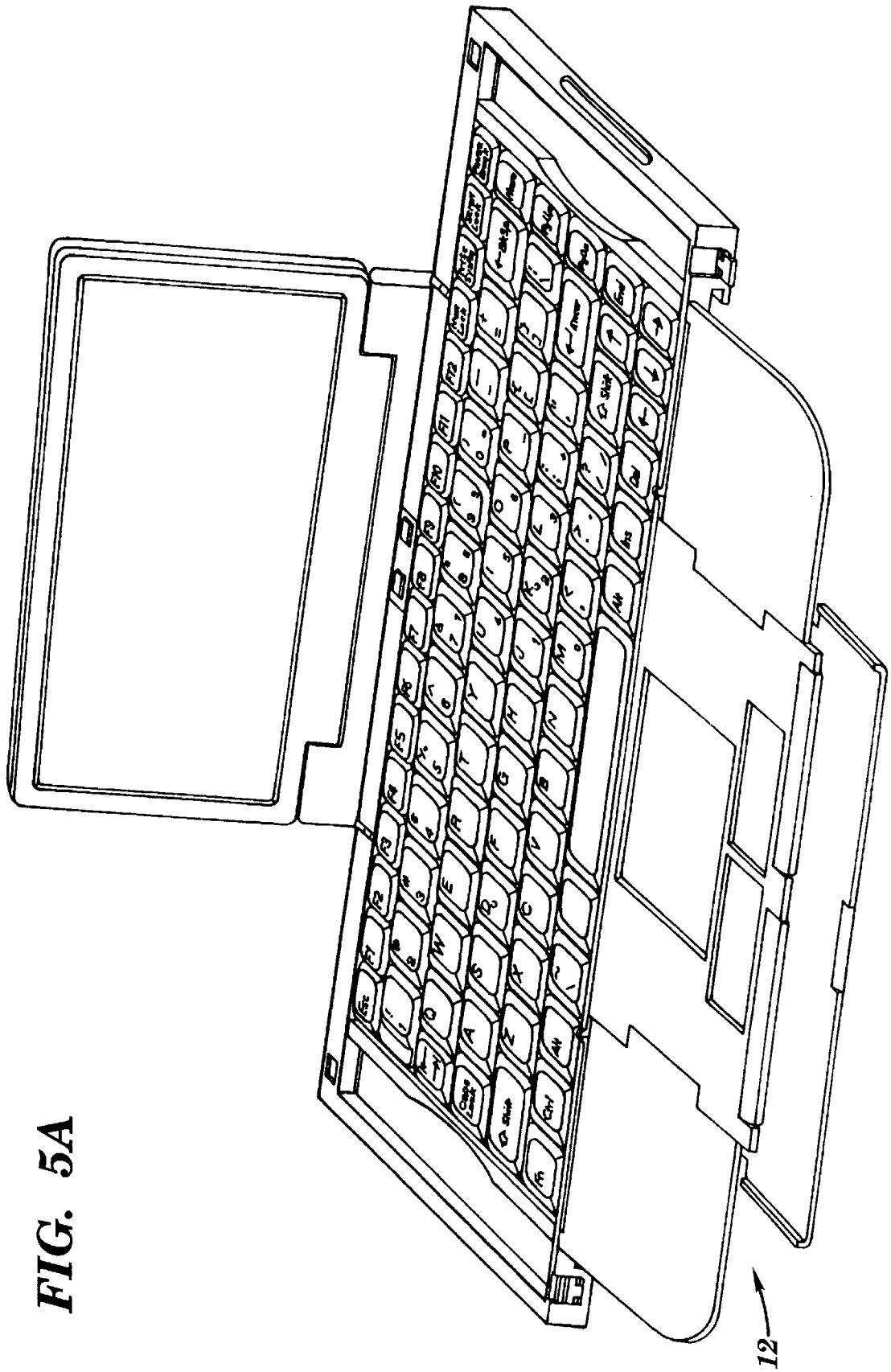
FIG. 5A is an alternative embodiment of the retractable palmrest in a sub-notebook computer.
Figure 5B:
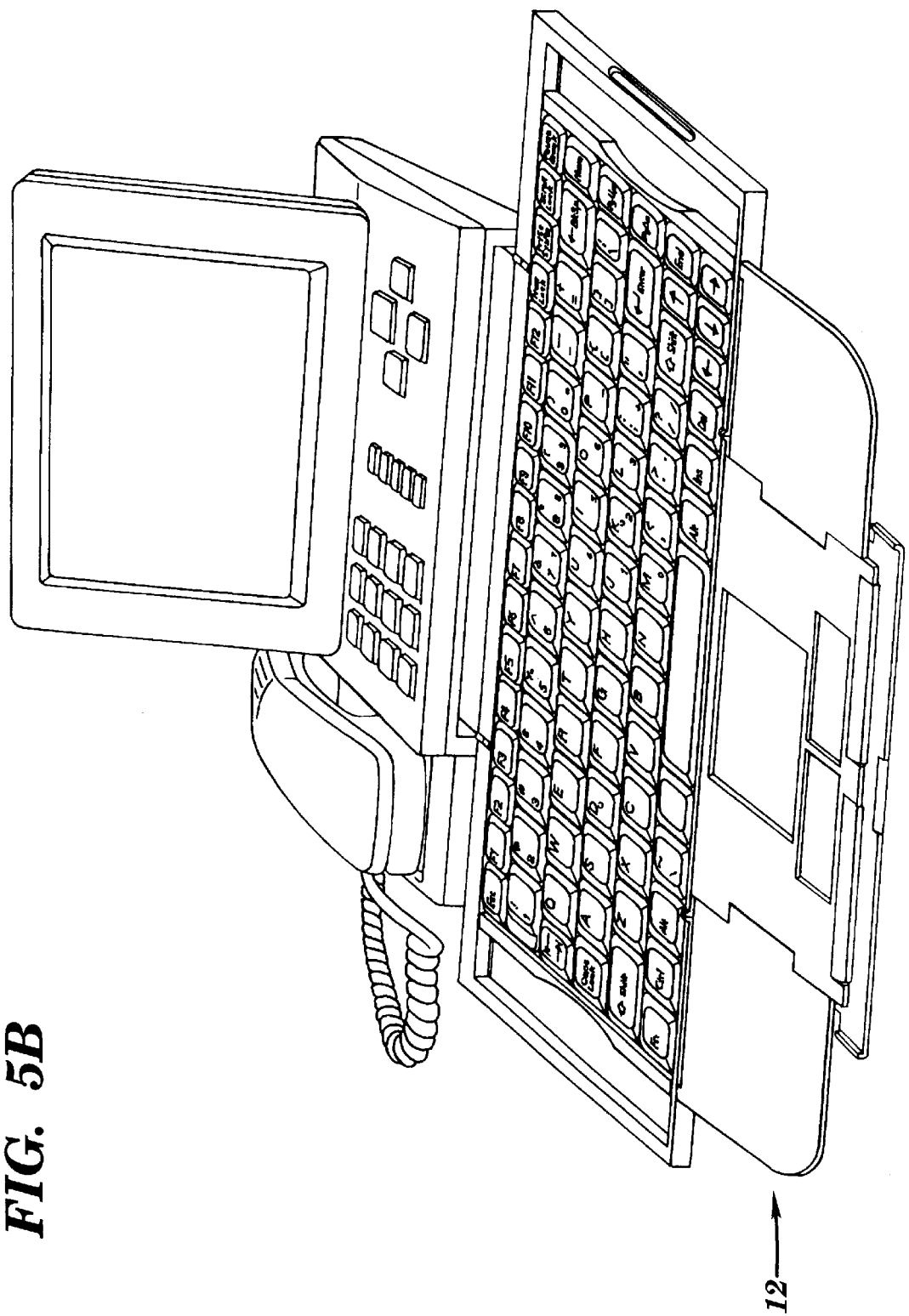
FIG. 5B is an alternative embodiment of the retractable palmrest in a stationary screen phone.
Figure 5C:
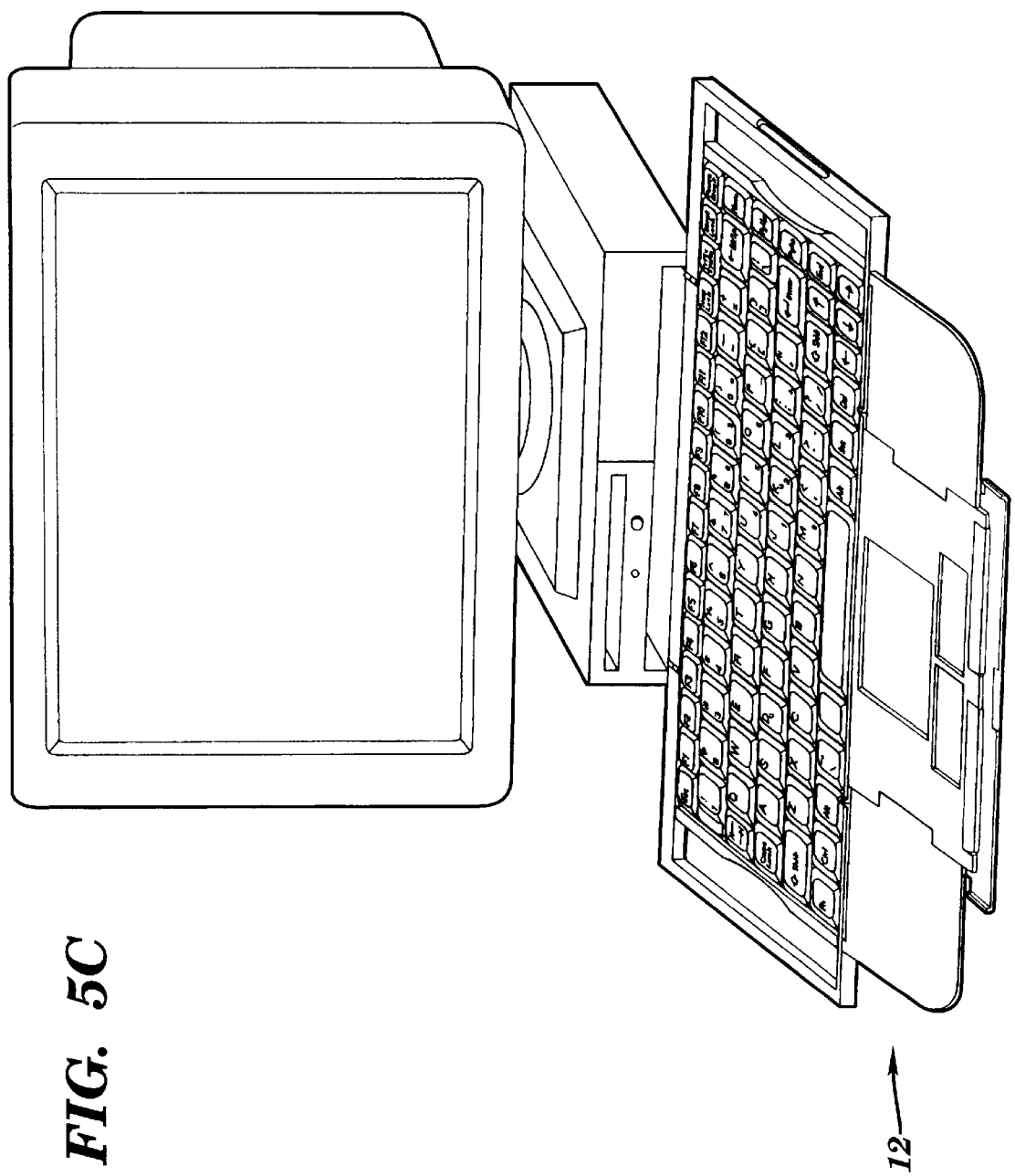
FIG. 5C is an alternative embodiment of the retractable palmrest in a small form-factor desktop computer.
Figure 5D:
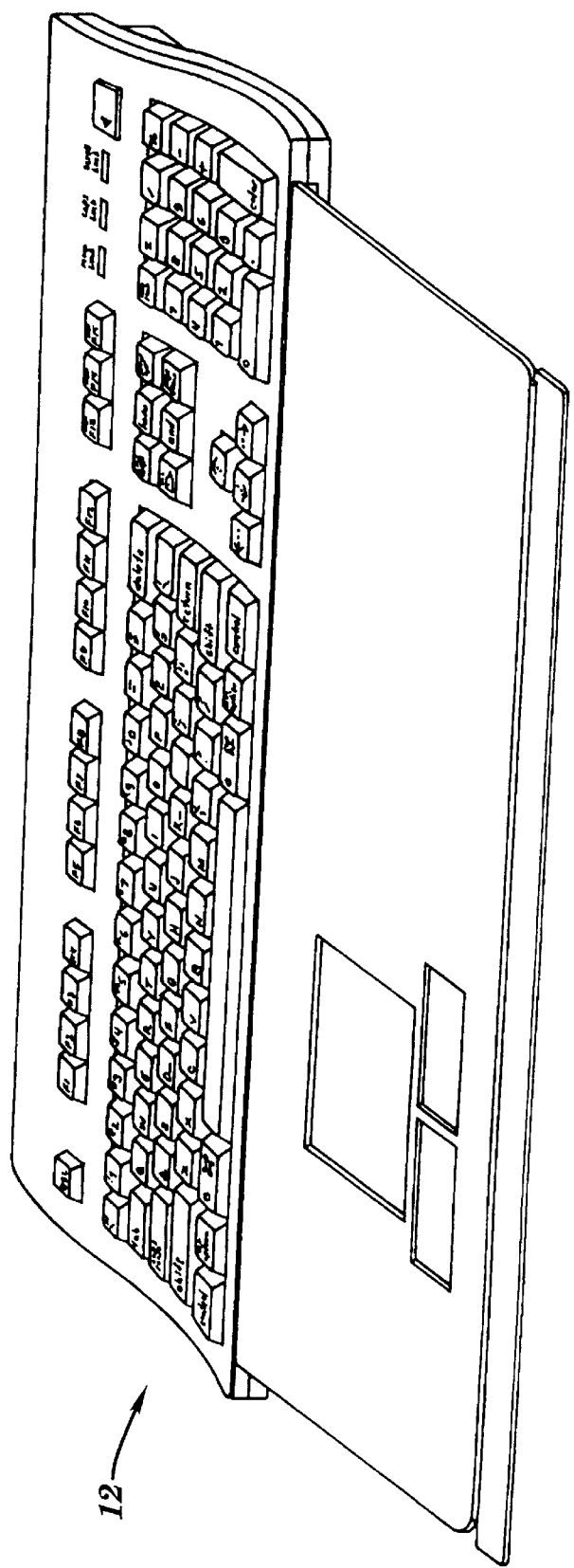
FIG. 5D is an alternative, non-folding embodiment of the retractable palmrest in a typical desktop computer keyboard housing.

Referring to FIGS. 5A and 5B, alternative embodiments of the retractable palmrest in a sub-notebook computer, in a stationary screen phone, in a small form-factor desktop computer, and in a typical desktop computer keyboard housing are illustrated. As noted earlier, many other mobile and stationary applications (not shown) can also benefit from this palmrest.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly

What is claimed is:

1. A electronic device equipped with a keyboard comprising:
   a platform comprising a front surface, opposing side surfaces, a back surface, a bottom surface, and a top surface;
   keys connected to the top surface of the platform to form the keyboard; and
   a palmrest comprising a surface with a front edge, opposing side edges, and a back edge, the palmrest slidably connected to the platform, the palmrest moveable to a retracted position substantially behind the front surface, in between the side surfaces, and in front of the back surface, above the bottom surface and below the top surface and to an extended position substantially in front of the front surface.

2. The electronic device as set forth in claim 1 wherein the palmrest comprises a base and one or more wing sections pivotally connected to the base, each of the wing sections pivotable to a first position resting on the base and to a second position providing an extension of the base wherein the wing sections rest substantially in the same plane as a top surface of the base in the second position.

3. The electronic device as set forth in claim 2 further comprising:
   one or more slots in the front surface of the platform; and
   one or more tab detents extending out from the back edge of the palmrest, each of the tab detents mating with one of the slots when the palmrest is in an extended and secured position.

4. The electronic device as set forth in claim 3 wherein each of the tab detents extends out from the back edge of one or more of the wing sections.

5. The electronic device as set forth in claim 1 further comprising an opening in the front surface of the platform which permits a substantial portion of the palmrest to pass through as the palmrest travels between the retracted and extended positions.

6. The electronic device as set forth in claim 5 further comprising:
   a track formed in each of the side surfaces; and
   at least one guiding projection extending from each of the opposing side edges, each of the projections seated to ride in one of the tracks as the platform moves through the opening between the retracted and extended positions.

7. The electronic device as set forth in claim 1 further comprising a cover member pivotally connected to the front edge of the palmrest, the cover member pivotable to a closed position resting adjacent the front face of the platform when the palmrest is in a retracted positions and to an open position providing a forward extension of the palmrest along substantially the same plane when the palmrest is in an extended position.

8. The electronic device as set forth in claim 1 further comprising one or more electrical components connected to the palmrest.

9. The electronic device as set forth in claim 8 wherein the electrical component is a computer mouse.

10. The electronic device as set forth in claim 6 wherein each of the tracks comprises at least two portions, wherein the two portions guide the palmrest in two different directions of travel.

11. An apparatus with a keyboard comprising:
    a platform;
    keys connected to the top surface of the platform to form the keyboard;
    a palmrest moveable to a retracted position substantially within the platform and to an extended position substantially outside of the platform in front of the keyboard;
    an opening in the platform which permits a substantial portion of the palmrest to pass through as the palmrest travels between the retracted and extended positions;
    a track formed in each of the side surfaces; and
    at least one guiding projection extending from each of the opposing side edges, each of the projections seated to ride in one of the tracks as the platform moves through the opening between the retracted and extended positions.

12. The apparatus as set forth in claim 11 wherein each of the tracks comprises at least two portions, wherein the two portions guide the palmrest in two different directions of travel.

13. The apparatus as set forth in claim 11 wherein the palmrest comprises a base and one or more wing sections pivotally connected to the base, each of the wing sections pivotable to a first position resting on the base and to a second position providing an extension of the base wherein the wing sections and the base rest substantially in the same plane in the second position.

14. The apparatus as set forth in claim 11 further comprising:
    one or more slots in a surface of the platform in front of the keyboard; and
    one or more tab detents extending out from the back edge of the palmrest, each of the tab detents mating with one of the slots when the palmrest is in an extended and secured position.

15. The apparatus as set forth in claim 14 wherein each of the tab detents extends out from the back edge of one or more of the wing sections.

16. An apparatus with a keyboard comprising:
    a platform comprising a base and one or more wing sections pivotally connected to the base, each of the wing sections pivotable to a first position resting on the base and to a second position providing an extension of the base wherein the wing sections and the base rest substantially in the same plane in the second position;
    keys connected to the top surface of the platform to form the keyboard; and
    a palmrest moveable to a retracted position substantially within the platform and to an extended position substantially outside of the platform in from of the keyboard.

17. The apparatus as set forth in claim 16 further comprising:
    one or more slots in a surface of the platform in front of the keyboard; and
    one or more tab detents extending out from the back edge of the palmrest, each of the tab detents mating with one of the slots when the palmrest is in an extended and secured position.

18. The apparatus as set forth in claim 17 wherein each of the tab detents extends out from the back edge of one or more of the wing sections.

* * * * *